US012791920B2

(12) United States Patent
Byun et al.

(10) Patent No.: US 12,791,920 B2
(45) Date of Patent: Nov. 10, 2026

(54) CAMERA MODULE

(71) Applicant: SAMSUNG ELECTRO-MECHANICS CO., LTD., Suwon-si (KR)

(72) Inventors: Se Ryun Byun, Suwon-si (KR); Jae Hyuk Huh, Suwon-si (KR); Jin Hwa Jung, Suwon-si (KR); So Mi Yang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 79 days.

(21) Appl. No.: 18/916,837

(22) Filed: Oct. 16, 2024

(65) Prior Publication Data

US 2025/0216751 A1 Jul. 3, 2025

(30) Foreign Application Priority Data

Dec. 28, 2023 (KR) ........................ 10-2023-0194602

(51) Int. Cl.
*G03B 17/17* (2021.01)
*G03B 17/12* (2021.01)

(52) U.S. Cl.
CPC ............. *G03B 17/17* (2013.01); *G03B 17/12* (2013.01); *G03B 2217/002* (2013.01)

(58) Field of Classification Search
CPC .......... G03B 17/12; G03B 17/17; G03B 3/10; G03B 5/06; G03B 30/00; G03B 2217/002
USPC .......................................................... 348/335
See application file for complete search history.

(56) References Cited

U.S. PATENT DOCUMENTS

| | | | | |
|---|---|---|---|---|
| 10,488,631 | B2 * | 11/2019 | Bachar | G02B 7/1805 |
| 11,523,040 | B2 * | 12/2022 | Iwase | G02B 27/646 |
| 12,025,813 | B2 * | 7/2024 | Choi | G02B 27/646 |
| 12,474,543 | B2 * | 11/2025 | Minamisawa | G01D 5/145 |
| 2006/0268431 | A1 * | 11/2006 | Jin | G02B 27/646 359/726 |
| 2018/0024329 | A1 * | 1/2018 | Goldenberg | G02B 13/0065 |
| 2018/0239161 | A1 * | 8/2018 | Seol | G02B 27/646 |
| 2019/0049687 | A1 * | 2/2019 | Bachar | H02K 41/0354 |
| 2019/0049702 | A1 * | 2/2019 | Chou | G02B 1/04 |
| 2019/0121103 | A1 * | 4/2019 | Bachar | G02B 7/1805 |
| 2020/0218082 | A1 * | 7/2020 | Choi | G02B 27/646 |
| 2021/0088877 | A1 * | 3/2021 | Mireault | H04N 23/54 |
| 2021/0368078 | A1 * | 11/2021 | Iwase | G02B 27/646 |
| 2022/0283404 | A1 * | 9/2022 | Minamisawa | G01D 5/145 |

FOREIGN PATENT DOCUMENTS

| | | |
|---|---|---|
| KR | 10-2023-0011048 A | 1/2023 |
| KR | 10-2023-0024606 A | 2/2023 |

* cited by examiner

*Primary Examiner* — Pritham D Prabhakher
(74) *Attorney, Agent, or Firm* — NSIP Law

(57) ABSTRACT

A camera module is provided. The camera module includes a first lens module including at least one lens disposed in a first optical axis direction, a reflective module including a reflective member and configured to rotate with respect to two rotation axes which are perpendicular each other, and a second lens module including at least one lens disposed in a second optical axis direction and configured to move in the second optical axis direction. The first lens module is configured to be coupled to the reflective module and is configured to rotate together with the reflective module with respect to the two rotation axes which are perpendicular to each other.

17 Claims, 16 Drawing Sheets

CAMERA MODULE

CROSS-REFERENCE TO RELATED APPLICATIONS

This application claims the benefit under 35 USC § 119(a) of Korean Patent Application No. 10-2023-0194602 filed on Dec. 28, 2023, in the Korean Intellectual Property Office, the entire disclosure of which is incorporated herein by reference for all purposes.

BACKGROUND

1. Field

The following description relates to a camera module.

2. Description of Related Art

Camera modules that are mounted on portable electronic devices such as, but not limited to, smartphones have limitations, in terms of increasing a thickness thereof, and thus, are equipped with reflective elements to bend a path of incident light.

However, as higher-spec optical characteristics are increasingly desired, there is a problem in that the height of camera modules equipped with reflective elements inevitably increases. For example, in order to lower the f-value, a lens with a relatively large diameter is necessary, and as the diameter of the lens increases, the height of the camera module also increases.

Specifically, with the recent introduction of foldable phones, the thickness of the form factor of portable electronic devices is becoming thinner, and accordingly, the need for a structure in which the diameter of the lens does not affect the height of the camera module has increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a first lens module including at least one lens disposed in a first optical axis direction; a reflective module including a reflective member, and configured to rotate with respect to two rotation axes which are perpendicular to each other; a second lens module including at least one lens disposed in a second optical axis direction, and configured to move in the second optical axis direction; and a housing configured to accommodate at least one of the first lens module, the reflective module, and the second lens module, wherein the first lens module is configured to be coupled to the reflective module and is configured to rotate together with the reflective module with respect to the two rotation axes which are perpendicular to each other.

The reflective module may include a reflective holder on which the reflective member is disposed, and a rotating holder on which the reflective holder is supported, and the first lens module may be coupled to the reflective holder, and may be disposed on an upper side of the reflective member.

The first lens module may include a first lens barrel that accommodates the at least one lens disposed in the first optical axis direction, and the first lens barrel may be coupled to a seating groove provided in the reflective holder.

An upper end of the first lens barrel may be provided at a lower height in the first optical axis direction than a highest vertex of a lens disposed closest to an object-side among the at least one lens arranged in the first optical axis direction.

The reflective holder may be configured to rotate relative to the rotating holder with respect to a first rotation axis, and the rotating holder is configured to rotate relative to the housing with respect to a second rotation axis perpendicular to the first rotation axis.

At least one first ball member that forms the first rotation axis may be disposed between the reflective holder and the rotating holder, and at least one second ball member that forms the second rotation axis may be disposed between the rotating holder and the housing.

The first lens module may be disposed in front of the reflective module, and the second lens module may be disposed in a rear of the reflective module, based on a path of incident light.

The second lens module may include a lens holder that accommodates the at least one lens disposed in the second optical axis direction, and the lens holder may include an avoidance portion in which a portion of an upper surface of the lens holder has been removed.

The avoidance portion may be provided on a side of the lens holder that is adjacent to the reflective module on the upper surface of the lens holder based on the second optical axis direction.

The avoidance portion may be provided on a portion of the lens holder that overlaps the first lens module in the first optical axis direction when the lens holder is positioned closest to the reflective module.

The camera module may further include an image sensor module that is disposed in a rear of the second lens module and includes an image sensor, wherein the second lens module may be configured to move between the reflective module and the image sensor module.

A portable electronic device may include the camera module.

In a general aspect, a camera module includes a reflective holder having a reflective member and at least one lens disposed in a first optical axis direction with respect to the reflective member; and a rotating holder on which the reflective holder is supported, wherein the reflective member and the at least one lens are configured to rotate about a first rotation axis, perpendicular to the first optical axis direction, and a second rotation axis, parallel to the first optical axis direction.

The at least one lens disposed in the first optical axis direction may be accommodated in a first lens barrel, and the first lens barrel may be coupled to an upper side of the reflective holder.

The camera module may further include a lens holder in which at least one lens that is disposed in a second optical axis direction perpendicular to the first optical axis direction is disposed with respect to the reflective member, wherein the lens holder is configured to move in the second optical axis direction.

The lens holder may include an avoidance portion that is provided at an upper surface portion of the lens holder adjacent to the reflective module, and the upper surface portion of the lens module on which the avoidance portion is disposed may be lower in height than other portions of the upper surface of the lens module.

The avoidance portion may overlap a lower end of the first lens barrel in the first optical axis direction when the lens holder is positioned closest to the reflective module, and a gap may be provided between the avoidance portion and the first lens barrel.

In a general aspect, a camera module includes a reflective module comprising a reflective member and a reflective holder on which the reflective member is mounted; a first lens module disposed on a first optical axis, and including a first lens barrel coupled to an upper side of the reflective holder; and a second lens module, including a lens holder, and disposed on a second optical axis perpendicular to the first optical axis, wherein the lens holder comprises an avoidance portion provided on an upper surface of the lens holder, and wherein the avoidance portion overlaps a lower end of the first lens barrel.

The avoidance portion may be provided in a form in which a portion of the upper surface of the lens holder is removed.

Other features and aspects will be apparent from the following detailed description, the drawings, and the claims.

Figure 1:
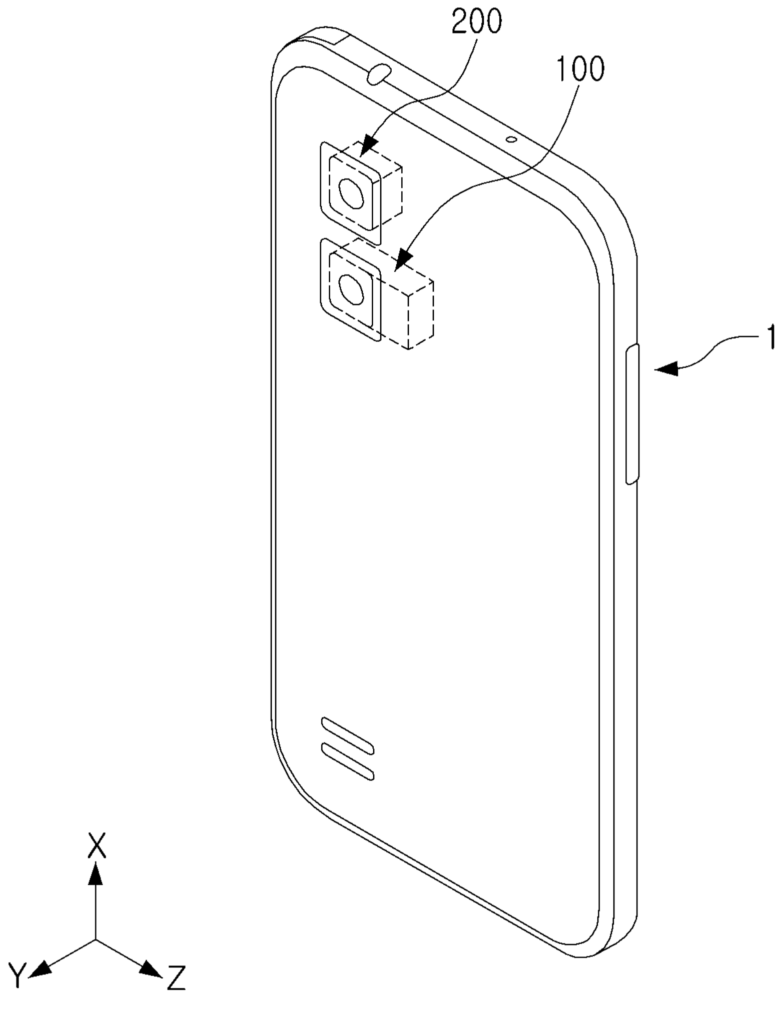
FIG. 1 illustrates a perspective view of an example portable electronic device equipped with a camera module, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

Although terms such as “first,” “second,” and “third”, or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as “on,” “connected to,” “coupled to,” or “joined to” another component, element, or layer, it may be directly (e.g., in contact with the other component, element, or layer) “on,” “connected to,” “coupled to,” or “joined to” the other component element, or layer, or there may reasonably be one or more other components elements, or layers intervening therebetween. When a component or element is described as “directly on”, “directly connected to,” “directly coupled to,” or “directly joined to” another component element, or layer, there can be no other components, elements, or layers intervening therebetween. Likewise, expressions, for example, “between” and “immediately between” and “adjacent to” and “immediately adjacent to” may also be construed as described in the foregoing.

The terminology used herein is for describing various examples only and is not to be used to limit the disclosure. The articles “a,” “an,” and “the” are intended to include the plural forms as well, unless the context clearly indicates otherwise. As non-limiting examples, terms “comprise” or “comprises,” “include” or “includes,” and “have” or “has” specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms “comprise” or “comprises,” “include” or “includes,” and “have” or “has” specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

One or more examples relate to a camera module that is configured to change a path of incident light at least once.

One or more examples also provide a camera module in which an increase in a diameter of a lens does not affect the length thereof in a height direction.

FIG. 1 illustrates a perspective view of an example portable electronic device equipped with a camera module, in accordance with one or more embodiments.

Referring to FIG. 1, an example camera module, in accordance with one or more embodiments, may be equipped on a portable electronic device 1. Although a smartphone is illustrated as an example of a portable electronic device 1 in FIG. 1, that is only an example, and the type of portable electronic device 1 that may be equipped with the example camera module is not limited thereto.

Referring to FIG. 1, a plurality of camera modules (hereinafter, first and second camera modules) 100 and 200, which may have different operations, may be equipped on a portable electronic device 1. In an example, the first camera module 100 may be a telephoto camera having a long focal length and a narrow angle of view and may include a reflective member. The second camera module 200 may be a wide-angle camera having a shorter focal length and a wider angle of view compared to the first camera module 100. The camera module according to an embodiment may be the first camera module 100.

In addition to the first and second camera modules 100 and 200, the portable electronic device 1 may additionally be equipped with another camera module, and a camera module may also be equipped on the opposite side (front) of the portable electronic device 1 illustrated in FIG. 1.

Figure 2:
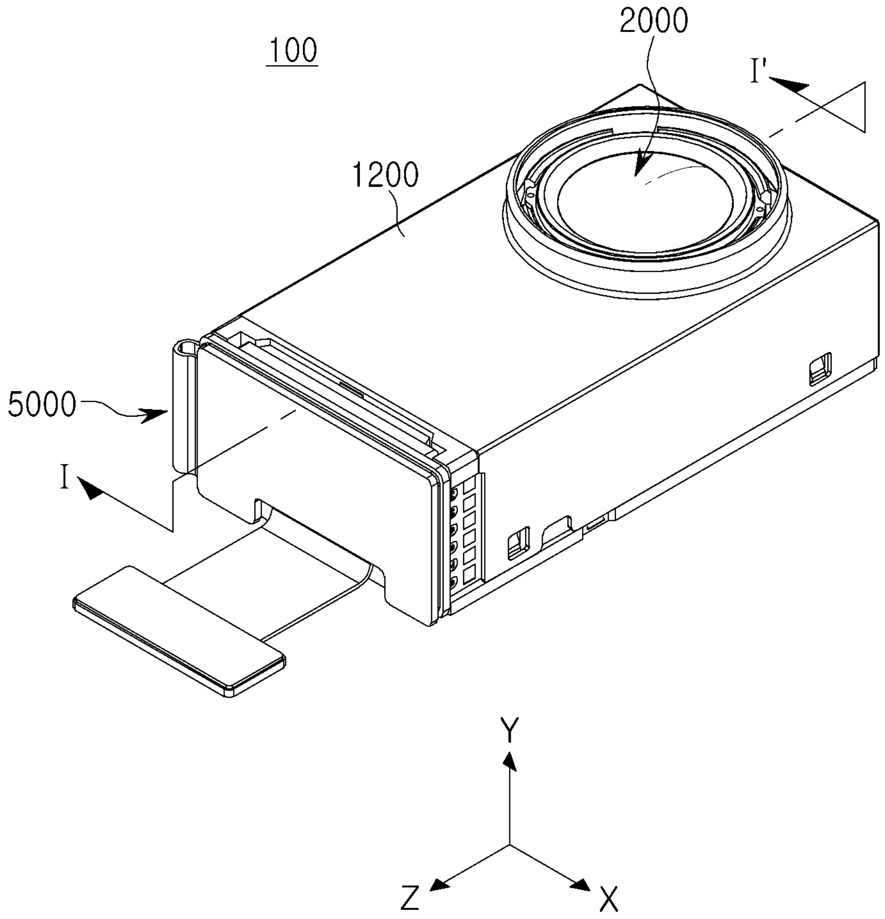
FIG. 2 illustrates a perspective view of an example camera module, in accordance with one or more embodiments.
Figure 3:
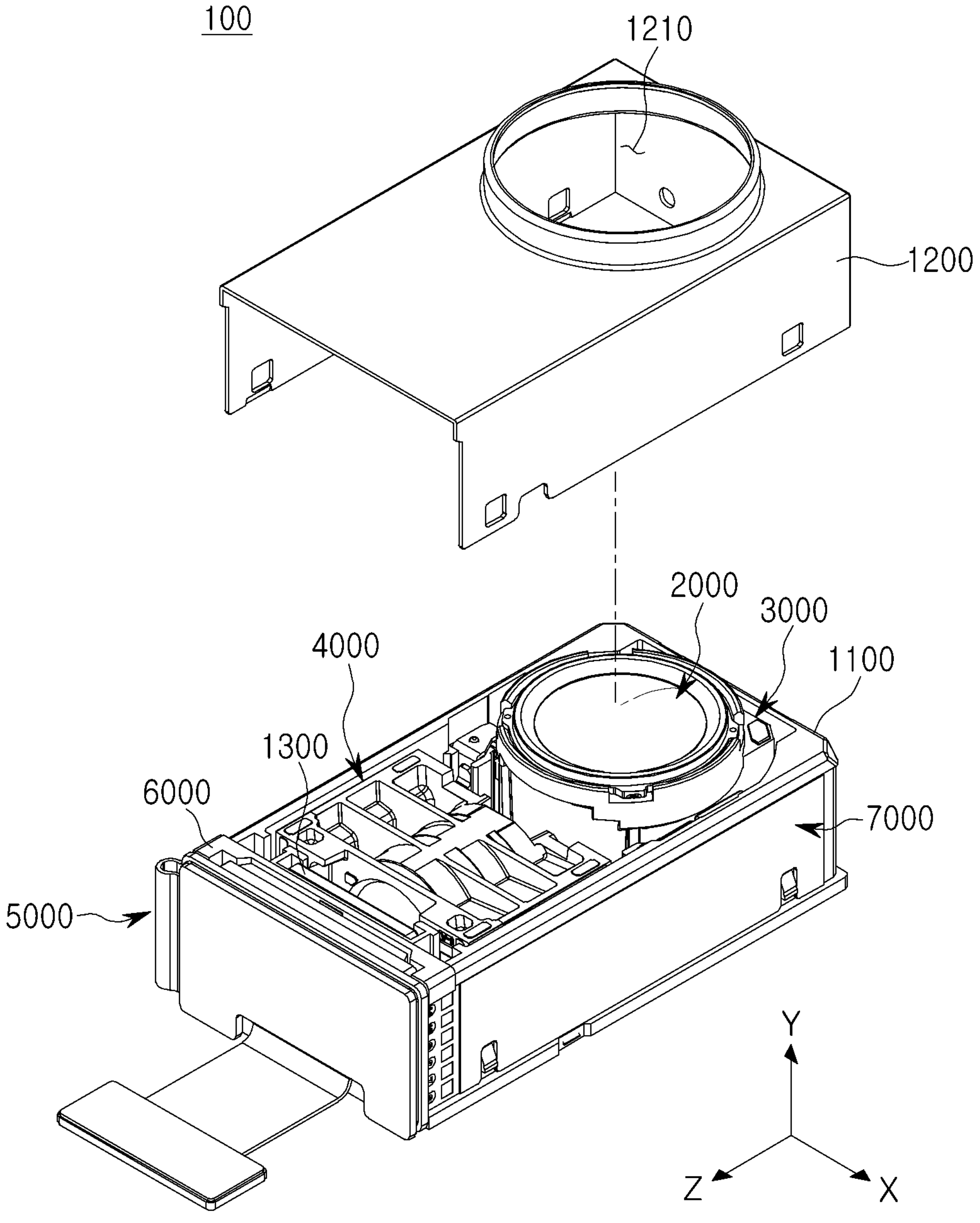
FIG. 3 illustrates a perspective view of an example camera module in which a shield in FIG. 2 is separated.
Figure 4:
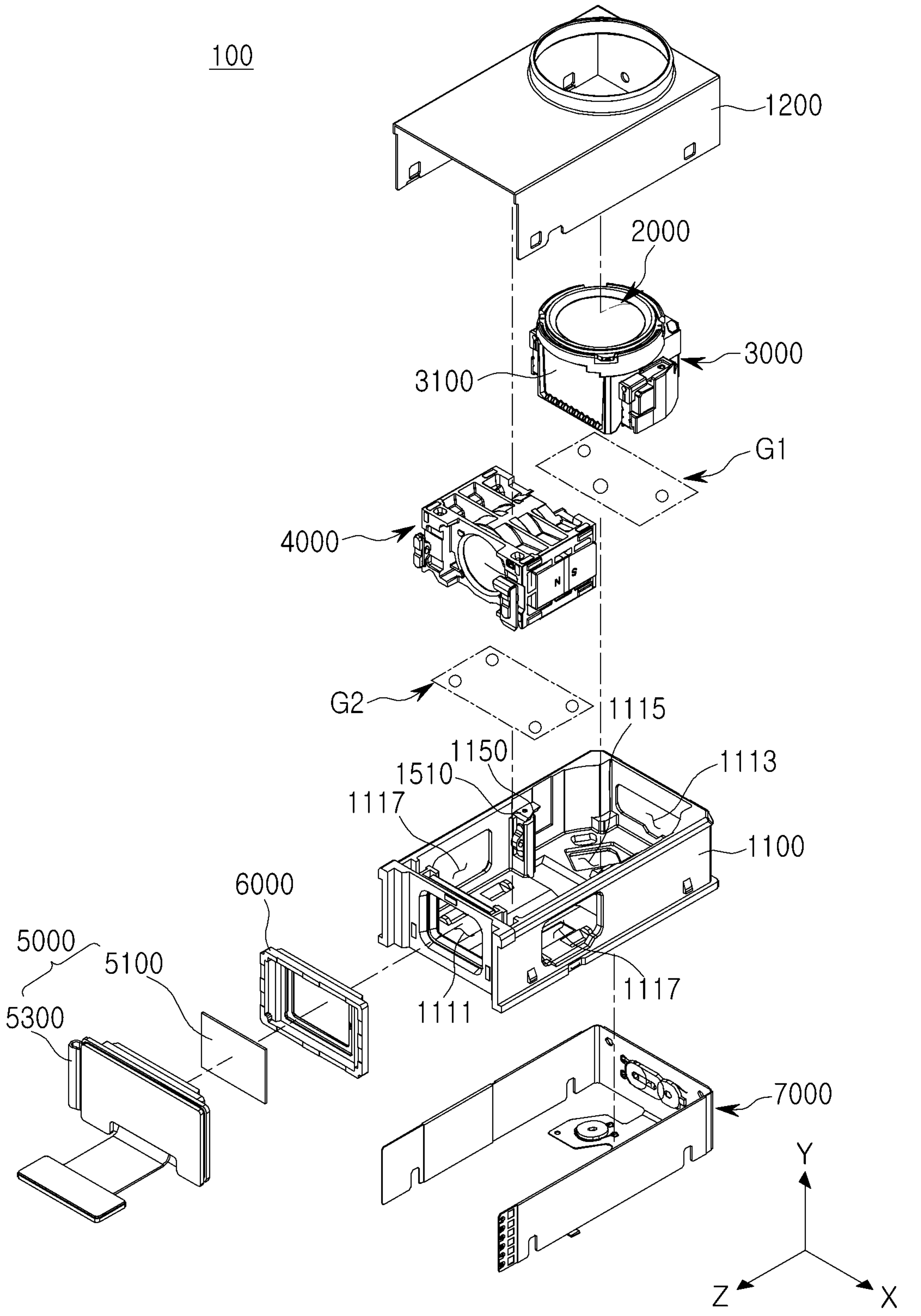
FIG. 4 illustrates a schematic exploded perspective view of an example camera module, in accordance with one or more embodiments.

FIG. 2 illustrates a perspective view of an example camera module, in accordance with one or more embodiments, FIG. 3 illustrates a perspective view of the camera module with a shield can separated in FIG. 2, and FIG. 4 is a schematic exploded perspective view of an example camera module, in accordance with one or more embodiments.

Referring to FIGS. 1 to 3, the camera module 100, in accordance with one or more embodiments, may have a rectangular parallelepiped shape. The camera module 100 according to an embodiment may be mounted on the portable electronic device 1 so that the height direction (Y-axis direction) of the camera module 100 corresponds to the thickness direction (Y-axis direction) of the portable electronic device 1. Therefore, light reflected from an external subject may be incident on the camera module 100 in a direction parallel to the height direction (Y-axis direction) of the camera module 100.

The camera module 100, in accordance with one or more embodiments, may be configured to change the propagation path of the incident light. In an embodiment, the camera module 100 may be provided with a reflective member, and the reflective member may change the propagation path of the incident light from the height direction (Y-axis direction) of the camera module 100 to the length direction (Z-axis direction) of the camera module 100. In the following description, the height direction (Y-axis direction) of the camera module 100 may be referred to as the first optical axis direction, and the length direction (Z-axis direction) of the camera module 100 may be referred to as the second optical axis direction.

Referring to FIGS. 3 and 4, the camera module 100, in accordance with one or more embodiments, may include a housing 1100, a shield can 1200, a plurality of lens modules (hereinafter, first and second lens modules) 2000 and 4000 including at least one lens, a reflective module 3000 including a reflective member 3100, and an image sensor module 5000.

The housing 1100 and the shield can 1200 may form the exterior of the camera module 100. In an embodiment, the housing 1100 may be a quadrangular box shape having an internal space, and the internal space may accommodate at least one of the first and second lens modules 2000 and 4000, the reflective module 3000, and the image sensor module 5000.

The shield can 1200 may be coupled to the housing 1100 to cover the internal space. The shield can 1200 may have an operation of protecting components accommodated in the internal space of the housing 1100 and an operation of shielding electromagnetic waves. In an embodiment, the shield can 1200 may be formed of a metal material.

In an embodiment, the housing 1100 may have a quadrangular box shape having a length in the second optical axis direction (Z-axis direction), and the first and second lens modules 2000 and 4000, the reflective module 3000, and the image sensor module 5000 may be disposed approximately along the length direction of the housing 1100. Specifically, in an example, the first lens module 2000 may be provided as an integral part with the reflective module 3000, and the reflective module 3000, the second lens module 4000, and the image sensor module 5000 may be disposed in the second optical axis direction (Z-axis direction).

In another embodiment, the housing 1100 may be provided in multiple units to accommodate the first lens module 2000, the reflective module 3000, the second lens module 4000, and the image sensor module 5000, respectively.

The first and second lens modules 2000 and 4000 may be respectively disposed in front and behind the reflective module 3000, based on the path of incident light. Since the reflective module 3000 includes a reflective member 3100 configured to change the path of incident light, the first lens module 2000 positioned in front of the reflective module 3000 and the second lens module 4000 positioned in the rear of the reflective module 3000 may have different optical axes. In an embodiment, the optical axis of the first lens module 2000 may be the first optical axis (Y-axis), the optical axis of the second lens module 4000 may be the second optical axis (Z-axis), and the first optical axis (Y-axis) and the second optical axis (Z-axis) may be approximately perpendicular to each other.

Light reflected from an external subject may be incident on the first lens module 2000. Accordingly, at least a portion of the first lens module 2000, for example, a lens (hereinafter, a first lens) L1 (FIG. 9) positioned most on the object side among at least one lens constituting the first lens module 2000, may be exposed to the outside of the camera module 100. In an embodiment, the shield can 1200 may include an opening 1210 to expose the first lens L1 to the outside.

Light incident on the first lens module 2000 may sequentially pass through the reflective module 3000 and the second lens module 4000 and then be incident on the image sensor module 5000.

At this time, one or more baffles 1300 may be provided between the second lens module 4000 and the image sensor module 5000 to block stray light that may enter the image sensor 5100 described below. In an embodiment, the baffle 1300 may be disposed in the internal space of the housing 1100 to limit the path of light so that excessive reflection does not occur when the light passes through the internal space of the housing 1100.

The image sensor module 5000 may include an image sensor 5100 and a printed circuit board (hereinafter, sensor board) 5300 on which the image sensor 5100 is mounted.

Light passing through the second lens module 4000 may be incident on the image sensor 5100. The image sensor 5100 may convert the incident light into an electric signal, and the converted electric signal may be output as an image through the display device of the portable electronic device 1.

A filter device 6000 may be disposed in front of the image sensor 5100 to filter light of a specific wavelength range among the light passing through the second lens module 4000. For example, the filter device 6000 may be an infrared blocking filter configured to block light in the infrared wavelength range.

In an example, the image sensor module 5000 may be coupled to one side of the housing 1100 perpendicular to the length direction (Z-axis direction) of the housing 1100 on the outside of the housing 1100. The housing 1100 may include a through-hole (or a first through-hole) 1111 on one side where the image sensor 5100 is coupled so that the imaging plane of the image sensor 5100 is exposed to the internal space of the housing 1100. However, in another embodiment, the image sensor module 5000 may be disposed in the internal space of the housing 1100, in which case the through-hole 1111 may be omitted.

The first lens module 2000, the reflective module 3000, and the second lens module 4000 may be movably accommodated in the housing 1100. Referring to FIG. 4, a plurality of ball members may be disposed between the housing 1100 and the first lens module 2000, the reflective module 3000, and the second lens module 4000 to guide and/or support movements thereof. In an embodiment, the first lens module 2000 and the reflective module 3000 may be rotated relative to the housing 1100 about two axes, and the second lens module 4000 may be moved relative to the housing 1100 in the optical axis direction.

In another embodiment, the rotation axes of the first lens module 2000 and the reflective module 3000 may be changed. Additionally, the first lens module 2000 may be fixed to the housing 1100, and only the reflective module 3000 may be rotated relative to the housing 1100.

Hereinafter, with reference to FIGS. 5 to 9, a first lens module 2000 and a reflective module 3000 according to an embodiment will be described in detail.

Figure 5:
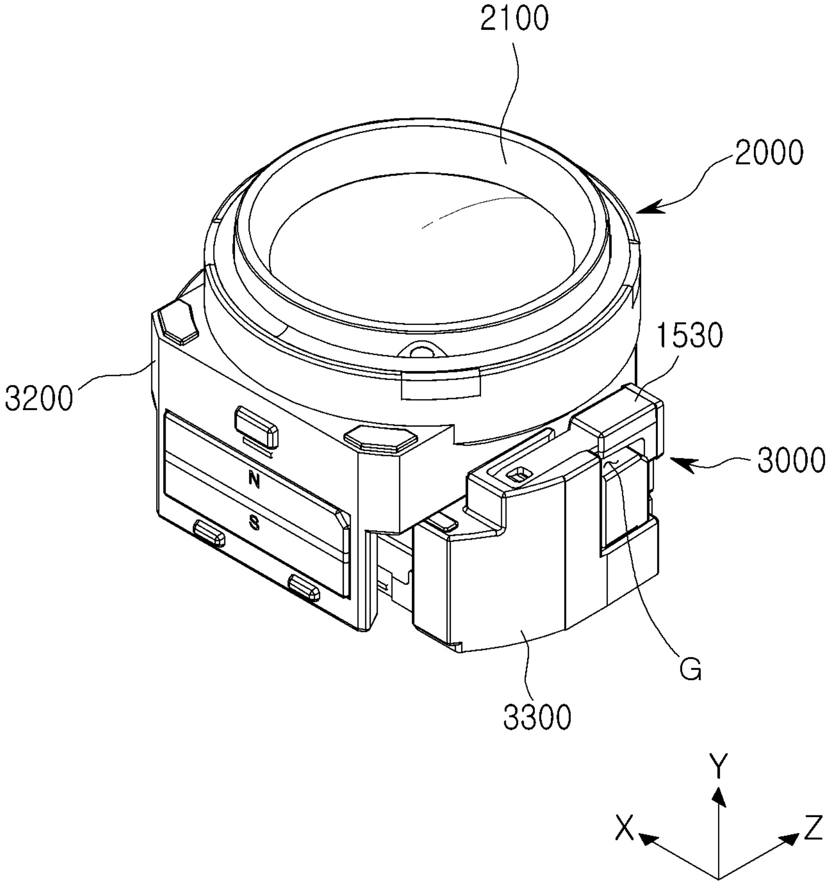
FIG. 5 illustrates a perspective view of a state in which a first lens module and a reflective module are combined, in accordance with one or more embodiments.
Figure 6:
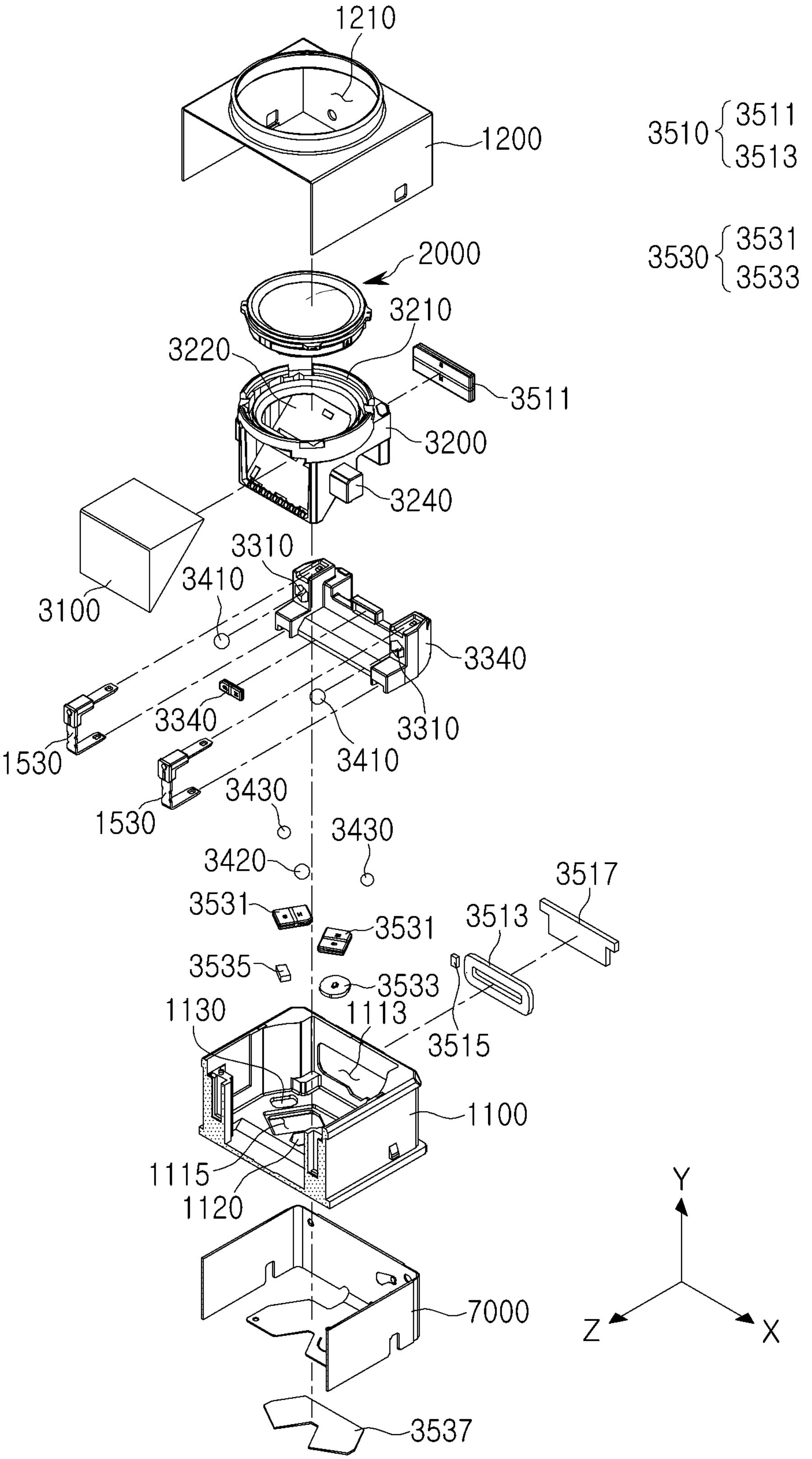
FIG. 6 illustrates a schematic exploded perspective view of FIG. 5.
Figure 7:
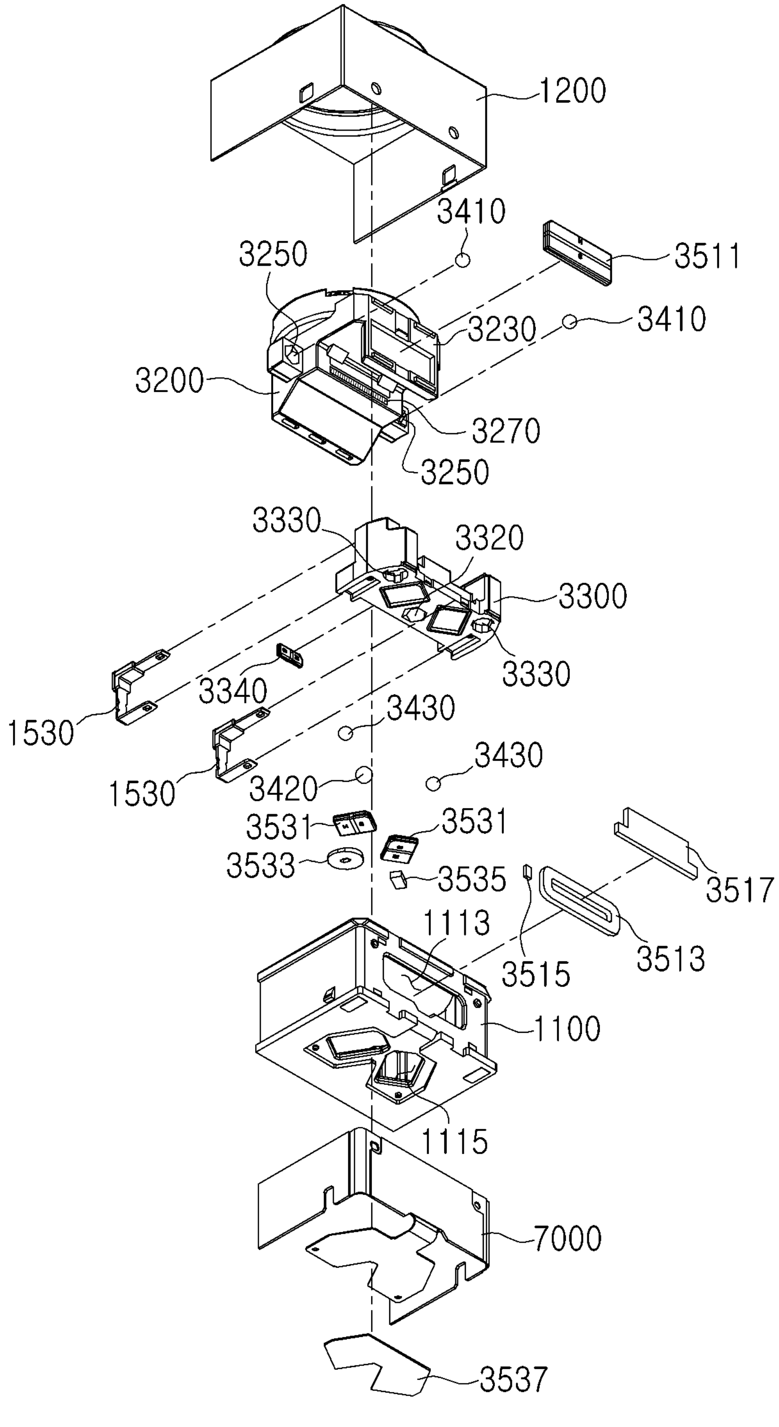
FIG. 7 illustrates a schematic bottom exploded perspective view of FIG. 5.
Figure 8:
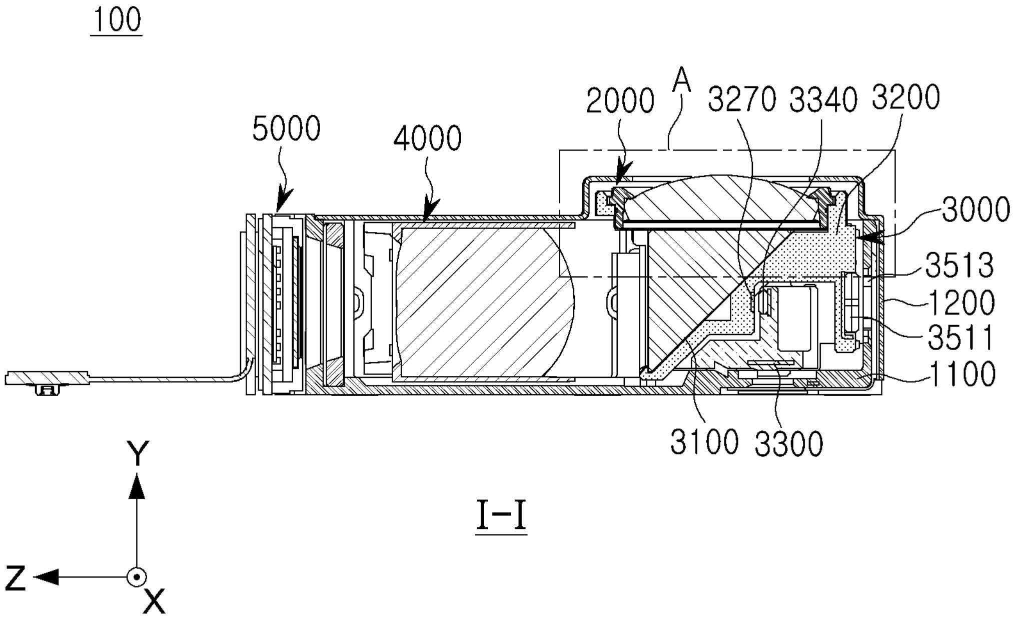
FIG. 8 illustrates a cross-sectional view taken along line I-I' of FIG. 2.
Figure 9:
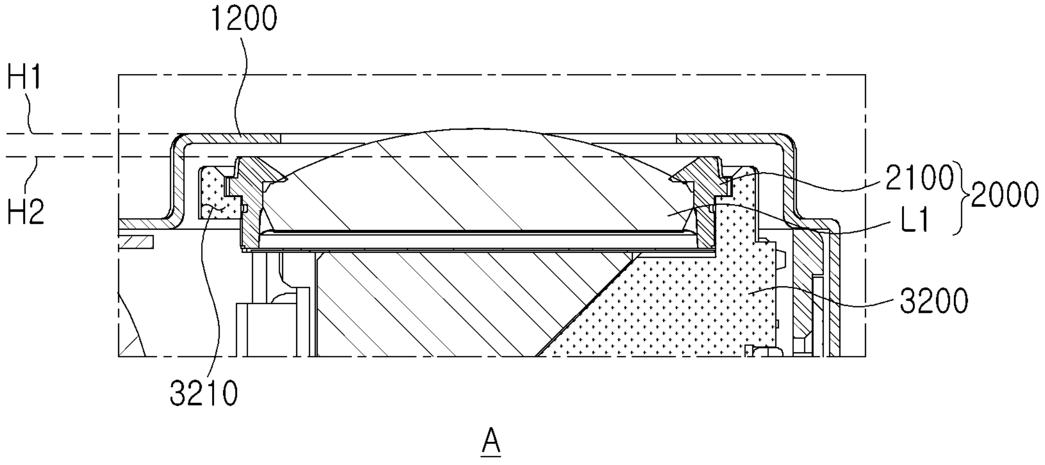
FIG. 9 illustrates an enlarged view of part A of FIG. 8.

FIG. 5 is a perspective view of a first lens module 2000 and a reflective module 3000 in a combined state, in accordance with one or more embodiments, FIG. 6 is a schematic exploded perspective view of FIG. 5, and FIG. 7 is a schematic bottom exploded perspective view of FIG. 5. In addition, FIG. 8 is a cross-sectional view taken along line I-I' of FIG. 2, and FIG. 9 is an enlarged view of part A of FIG. 8.

As described above, in accordance with one or more embodiments, the first lens module 2000 and the reflective module 3000 may be provided as one unit.

The first lens module 2000 may include a first lens barrel 2100 in which at least one lens (L1) is accommodated. The reflective module 3000 includes a reflective member 3100, and may include a reflective holder 3200 on which the reflective member 3100 is mounted, and a rotating holder 3300 on which the reflective holder 3200 is supported.

Referring to FIG. 5, the first lens barrel 2100 may be coupled to the upper side of the reflective holder 3200. The first lens module 2000 and the reflective module 3000 may be disposed in the first optical axis direction (Y-axis direction), and the center of at least one lens of the first lens module 2000 and the center of the reflective surface of the reflective member 3100 may be approximately disposed on the first optical axis (Y-axis).

Referring to FIG. 6, a seating groove 3210 may be provided on the upper side of the reflective holder 3200. The first lens barrel 2100 may be disposed in the seating groove 3210.

A reflective member 3100 may be mounted on the reflective holder 3200. A mounting surface 3220 may be provided on the reflective holder 3200, and a reflective surface of the reflective member 3100 may be disposed on the mounting surface 3220.

The reflective member 3100 may be configured to change the path of incident light. In an example, the reflective member 3100 may be a prism. However, this is only an example, and in an example, the reflective member 3100 may be implemented as a mirror instead of a prism.

The reflective member 3100 may include an incident surface on which light is incident, a reflective surface which reflects light, and an exit surface from which light is emitted. In an embodiment, light incident in the first optical axis direction (Y-axis direction) may be reflected by the reflective surface and the propagation path thereof may be changed to the second optical axis direction (Z-axis direction). For example, the reflective member 3100 may change the propagation path of the incident light by approximately 90 degrees.

Referring to FIG. 4, the reflective module 3000 and the second lens module 4000 may be disposed in the second optical axis direction (Z-axis direction), and the center of at least one lens L2 of the second lens module 4000, specifically, the center of the plurality of lenses and the center of the reflective surface of the reflective member 3100 may be approximately disposed on the second optical axis (Z-axis).

The reflective holder 3200 may be configured to rotate around the first rotation axis (X-axis) as a rotation axis. The first rotation axis (X-axis) may be perpendicular to both the first optical axis (Y-axis) and the second optical axis (Z-axis). The reflective member 3100 may be mounted on the reflective holder 3200, so that it may be rotated about the first rotation axis (X-axis) together with the reflective holder 3200. In addition, according to an embodiment, the first lens module 2000 is coupled to the upper side of the reflective holder 3200, so that the first lens module 2000 may also be rotated about the first rotation axis (X-axis) together with the reflective holder 3200.

The reflective holder 3200 may be rotated relative to the rotating holder 3300. A plurality of ball members 3410 may be disposed between the reflective holder 3200 and the rotating holder 3300 to support the rotation of the reflective holder 3200.

In an embodiment, the plurality of ball members 3410 may include two ball members 3410 spaced apart from each other in the direction of the first rotation axis (X-axis). The plurality of ball members 3410 may form a first rotation axis (X-axis) which is a rotation axis of the reflective holder 3200. The first rotation axis (X-axis) formed by the plurality of ball members 3410 may pass approximately through the center of the reflective surface. In another embodiment, the number of the plurality of ball members 3410 may be changed.

The reflective holder 3200 and the rotating holder 3300 may include receiving grooves 3250 and 3310 for receiving the plurality of ball members 3410. The receiving grooves 3250 and 3310 may be provided in a number corresponding to the plurality of ball members 3410 to receive the plurality of ball members 3410, respectively.

In an embodiment, the reflective holder 3200 may include two first receiving grooves 3250 spaced apart in the first rotation axis direction (X-axis direction), and the rotating holder 3300 may include two second receiving grooves 3310 spaced apart in the first rotation axis direction (X-axis direction). The reflective holder 3200 may include a protrusion 3240 that protrudes in the first rotation axis direction (X-axis direction) on both sides of the mounting surface 3220, and the first receiving groove 3250 may be provided on the protrusion 3240.

The first receiving groove 3250 and the second receiving groove 3310 may be disposed to face each other in the second optical axis direction (Z-axis direction). A plurality of ball members 3410 may be disposed between the first receiving groove 3250 and the second receiving groove 3310, and different portions of the plurality of ball members 3410 may be received in the first receiving groove 3250 and the second receiving groove 3310.

The plurality of ball members 3410 may form a first rotational axis (X-axis) while rotating in place while being received in the first receiving groove 3250 and the second receiving groove 3310. Accordingly, the plurality of ball members 3410 may be supported at three points in at least some of the two first receiving grooves 3250 and the two second receiving grooves 3310. Specifically, the plurality of ball members 3410 may be supported at two points in some of the two first receiving grooves 3250 and the two second receiving grooves 3310 in consideration of manufacturing and assembly tolerances. For example, according to a detailed embodiment, the plurality of ball members 3410 may be supported at three points in some of the two first receiving grooves 3250 and the two second receiving grooves 3310, and supported at two points in some of the other.

The reflective holder 3200 may be supported on the rotating holder 3300 with a plurality of ball members 3410 interposed therebetween. For example, the reflective holder 3200 may be supported on the rotating holder 3300 in the second optical axis direction (Z-axis direction).

The reflective holder 3200 may be supported in close contact with the rotating holder 3300 by a magnetic attraction generated between a pair of magnetic bodies 3270 and 3340. The pair of magnetic bodies 3270 and 3340 may include a first magnetic body 3270 disposed on the reflective holder 3200 and a second magnetic body 3340 disposed on the rotating holder 3300. In an embodiment, the first magnetic body 3270 may be a pulling yoke, and the second magnetic body 3340 may be a pulling magnet. The first magnetic body 3270 and the second magnetic body 3340 may be disposed to face each other in the second optical axis direction (Z-axis direction), and the magnetic attraction may be formed in the second optical axis direction (Z-axis direction).

Additionally, the magnetic attraction generated between a pair of magnetic bodies 3270 and 3340 may prevent the detachment of a plurality of ball members 3410 disposed between the reflective holder 3200 and the rotating holder 3300, and thus the driving stability of the reflective holder 3200 may be secured.

The reflective module 3000 may include a first driving unit 3510 that generates driving force to rotate the reflective holder 3200 relative to the rotating holder 3300 about the first rotation axis (X-axis).

The first driving unit 3510 may include a first driving magnet 3511 disposed on the reflective holder 3200 and a first driving coil 3513 disposed on the housing 1100.

In an embodiment, the reflective holder 3200 may include an extension 3230 that extends between the rotating holder 3300 and the housing 1100, and the first driving magnet 3511 may be disposed on the extension 3230 of the reflective holder 3200.

The first driving coil 3513 may be disposed in the housing 1100 while mounted on a substrate 7000. In an example, the substrate 7000 equipped with the first driving coil 3513 may be disposed in the housing 1100. The housing 1100 may include a through-hole (or a second through-hole) 1113 on one side thereof, where the substrate 7000 equipped with the first driving coil 3513 is coupled so that the first driving coil 3513 is exposed to the internal space of the housing 1100.

The first driving magnet 3511 and the first driving coil 3513 may be disposed to face each other in the second optical axis direction (Z-axis direction). In an embodiment, the first driving magnet 3511 may be disposed on the extension 3230, and the first driving coil 3513 may be exposed to the internal space of the housing 1100 through the second through-hole 1113, so that the first driving magnet 3511 and the first driving coil 3513 may directly face each other in the second optical axis direction (Z-axis direction).

On one side of the first driving magnet 3511 facing the first driving coil 3513, a first polarity region (N pole or S pole), a neutral region, and a second polarity region (S pole or N pole) may be sequentially provided along the first optical axis direction (Y-axis direction).

When power is applied to the first driving coil 3513, a driving force may be generated to rotate the reflective holder 3200 about the first rotation axis (X-axis) due to the electromagnetic interaction between the first driving coil 3513 and the first driving magnet 3511.

A first position sensor 3515 may be mounted on the substrate 7000 together with the first driving coil 3513. The first position sensor 3515 may be disposed on the inner side or the outer side of the first driving coil 3513, and may be provided in one or more units.

The first position sensor 3515 may detect the position of the first driving magnet 3511. In a non-limited example, the first position sensor 3515 may be a Hall sensor, and may be positioned to face the first driving magnet 3511 to sense the amount of movement of the first driving magnet 3511 by detecting a change in magnetic flux.

A first yoke 3517 may be positioned on the opposite side of the substrate 7000 on which the first driving coil 3513 and the first position sensor 3515 are mounted. The first yoke 3517 may be positioned to face the first driving magnet 3511 with the first driving coil 3513 interposed therebetween. In an embodiment, the first yoke 3517 may focus the magnetic force of the first driving magnet 3511.

The rotating holder 3300 may be configured to rotate with respect to a second rotation axis (Y-axis) as a rotation axis. The second rotation axis (Y-axis) may be approximately parallel to the first optical axis (Y-axis) and may be perpendicular to both the first rotation axis (X-axis) and the second optical axis (Z-axis). The reflective holder 3200 may be disposed on the rotating holder 3300, and thus, may be rotated about the second rotation axis (Y-axis) together with the rotating holder 3300. Additionally, since the reflective member 3100 may be mounted on the reflective holder 3200, the reflective member 3100 may be rotated about the second rotation axis (Y-axis) together with the reflective holder 3200 and the rotating holder 3300. Furthermore, according to an embodiment, since the first lens module 2000 may be coupled to the upper side of the reflective holder 3200, the first lens module 2000 may also be rotated about the second rotation axis (Y-axis) together with the reflective holder 3200 and the rotating holder 3300.

The rotating holder 3300 may be rotated relative to the housing 1100. A first ball group G1 (FIG. 4) is disposed between the rotating holder 3300 and the housing 1100 to support the rotation of the rotating holder 3300.

In an embodiment, the first ball group G1 may include one rotation axis ball 3420 that forms a second rotation axis (Y-axis). Specifically, the second rotation axis (Y-axis) may pass through the rotation axis ball 3420. Additionally, the first ball group G1 may include a plurality of guide balls 3430 spaced apart from the second rotation axis (Y-axis). In an example, the guide balls 3430 may be provided in two, and in another embodiment, the number of guide balls 3430 may be changed.

In an embodiment, the first rotation axis (X-axis) which is the rotation axis of the reflective holder 3200 and the second rotation axis (Y-axis) which is the rotation axis of the rotating holder 3300 may intersect each other approximately perpendicularly. The intersection point thereof may be located on the reflective surface of the reflective member 3100, approximately at the center of the reflective surface.

The rotating holder 3300 and the housing 1100 may respectively include receiving grooves 3320 and 1120 that receive the rotation axis balls 3420. In an embodiment, the rotating holder 3300 may include a third receiving groove 3320, and the housing 1100 may include a fourth receiving groove 1120. The third receiving groove 3320 and the fourth receiving groove 1120 may be disposed to face each other in the first optical axis direction (Y-axis direction). The rotation axis ball 3420 may be disposed between the third receiving groove 3320 and the fourth receiving groove 1120, and different parts of the rotation axis ball 3420 may be accommodated in the third receiving groove 3320 and the fourth receiving groove 1120.

The rotation axis ball 3420 may form a second rotation axis (Y-axis) while rotating in place while accommodated in the third receiving groove 3320 and the fourth receiving groove 1120. Accordingly, the rotation axis ball 3420 may be supported at three points in at least some of the third receiving groove 3320 and the fourth receiving groove 1120. According to a detailed embodiment, the rotation axis ball 3420 may be supported at three points in one of the third receiving groove 3420 and the fourth receiving groove 3430, and may be supported at two points in the other.

Additionally, the rotating holder 3300 and the housing 1100 may respectively include guide grooves 3330 and 1130 that receive a plurality of guide balls 3430. The guide grooves 3330 and 1130 may be provided in a number corresponding to the plurality of guide balls 3430 to accommodate a plurality of guide balls 3430, respectively.

In an embodiment, the rotating holder 3300 may include two first guide grooves 3330 spaced apart from the third receiving groove 3320, and the housing 1100 may include two second guide grooves 1130 spaced apart from the fourth receiving groove 1120. In an example, the first guide groove 3330 and the second guide groove 1130 may have a curved or straight shape that extends approximately in the rotational direction of the rotating holder 3300.

The first guide groove 3330 and the second guide groove 1130 may be disposed to face each other in the first optical axis direction (Y-axis direction). A plurality of guide balls 3430 may be disposed between the first guide groove 3330 and the second guide groove 1130, and different portions of the plurality of guide balls 3430 may be accommodated in the first guide groove 3330 and the second guide groove 1130.

The plurality of guide balls 3430 may guide the rotation of the rotating holder 3300 while rolling along the extension direction of the first guide groove 3330 and the second guide groove 1130, while accommodated in the first guide groove 3330 and the second guide groove 1130. In an embodiment, the plurality of guide balls 3430 may be supported at one point in at least some of the first guide groove 3330 and the second guide groove 1130.

The rotating holder 3300 may be supported in the housing 1100 with the first ball group G1 described above interposed therebetween. For example, the rotating holder 3300 may be supported by the housing 1100 in the first optical axis direction (Y-axis direction). The support structure of the rotating holder 3300 will be described later.

The reflective module 3000 may include a second driving unit 3530 that generates driving force to rotate the rotating holder 3300 relative to the housing 1100 about a second rotation axis (Y-axis).

The second driving unit 3530 may include a second driving magnet 3531 disposed on the rotating holder 3300 and a second driving coil 3533 disposed on the housing 1100.

The second driving magnet 3531 may be disposed on the bottom surface of the rotating holder 3300.

The second driving coil 3533 may be disposed on the housing 1100 while being mounted on the substrate 7000. The housing 1100 may include a through-hole (or a third through-hole) 1115 on one surface, for example, a bottom surface of the housing 1100, to which the substrate 7000 having the second driving coil 3533 mounted thereon is coupled so that the second driving coil 3533 is exposed to the internal space of the housing 1100. In an embodiment, the bottom surface of the housing 1100 may include the third through-hole 1115.

The second driving magnet 3531 and the second driving coil 3533 may be disposed to face each other in the first optical axis direction (Y-axis direction). In an embodiment, the second driving magnet 3531 may be disposed on the bottom surface of the rotating holder 3300, and the second driving coil 3533 may be exposed to the internal space of the housing 1100 through the third through-hole 1115, so that the second driving magnet 3531 and the second driving coil 3533 may directly face each other in the first optical axis direction (Y-axis direction).

On one side of the second driving magnet 3531 facing the second driving coil 3533, a first polarity region (N pole or S pole), a neutral region, and a second polarity region (S pole or N pole) may be provided in order approximately along the rotation direction of the rotating holder 3300.

When power is applied to the second driving coil 3533, a driving force may be generated to rotate the rotating holder 3300 about the second rotation axis (Y-axis) due to the electromagnetic interaction between the second driving coil 3533 and the second driving magnet 3531.

A second position sensor 3535 may be mounted on the substrate 7000 together with the second driving coil 3533. The second position sensor 3535 may be disposed on the inner or outer side of the second driving coil 3533, and may be provided in one or more units.

The second position sensor 3535 may detect the position of the second driving magnet 3531. In an example, the second position sensor 3535 may be a Hall sensor, and may be disposed to face the second driving magnet 3531 to detect a change in magnetic flux, thereby sensing the amount of movement of the second driving magnet 3531.

In an embodiment, the second driving unit 3530 includes two second driving magnets 3531, one of which may face the second driving coil 3533 and the other may face the second position sensor 3535.

A second yoke 3537 may be disposed on the side of the substrate 7000 opposite to one side thereof on which the second driving coil 3533 and the second position sensor 3535 are mounted. The second yoke 3537 may be disposed to face the second driving magnet 3531 with the second driving coil 3533 interposed therebetween. In an embodiment, the second yoke 3537 may focus the magnetic force of the second driving magnet 3531. Additionally, the second yoke 3537 may generate magnetic attraction with the second driving magnet 3531.

Specifically, the rotating holder 3300 may be supported in close contact with the housing 1100 by the magnetic attraction generated between the second yoke 3537 and the second driving magnet 3531. The second yoke 3537 and the second driving magnet 3531 may be disposed to face each other in the first optical axis direction (Y-axis direction), and the magnetic attraction may be formed in the first optical axis direction (Y-axis direction).

The magnetic attraction generated between the second yoke 3537 and the second driving magnet 3531 may prevent the first ball group G1 disposed between the rotating holder 3300 and the housing 1100 from being separated, and thus the driving stability of the rotating holder 3300 may be secured.

A stopper (or first stopper) 1530 may be coupled to the rotating holder 3300 to surround the reflective holder 3200. At this time, as illustrated in FIG. 5, a gap (G) may be provided between the stopper 1530 and the reflective holder 3200 so that the reflective holder 3200 may rotate relative to the rotating holder 3300. For example, a gap (G) may be provided between the stopper 1530 and the reflective holder 3200 in the first optical axis direction (Y-axis direction) and the second optical axis direction (Z-axis direction).

The stopper 1530 may limit the rotation range of the reflective module 3000 and prevent collision between the reflective module 3000 and the housing 1100 when the reflective module 3000 rotates. Additionally, a buffer member may be combined with the stopper 1530 so that shock and noise generated when the reflective module 3000 rotates and hits the housing 1100 may be reduced.

Meanwhile, as described above, in an embodiment, the first lens module 2000 may be configured to rotate with respect to the first rotation axis (X-axis) and the second rotation axis (Y-axis) together with the reflective module 3000 when the camera module 100 is shake-corrected. Therefore, even when the shake is corrected, the center of at least one lens of the first lens module 2000 and the center of the reflective member 3100 may always coincide.

Additionally, in accordance with one or more embodiments, since the first lens module 2000 may be rotated together with the reflective module 3000, a sufficient space (or gap) should be secured between the first lens module 2000 and the shield can 1200 disposed on the upper side of the first lens module 2000. Accordingly, as illustrated in FIGS. 8 and 9, an upper end H2 of the first lens barrel 2100 may be positioned at a lower height in the first optical axis direction (Y-axis direction) than a highest point H1 of the first lens L1. Accordingly, a space may be secured between the first lens barrel 2100 and the shield can 1200, so that interference of the shield can 1200 may be avoided when the first lens module 2000 is rotated.

Next, referring to FIGS. 10 to 15, a second lens module 4000, in accordance with one or more embodiments, will be described in detail.

Figure 10:
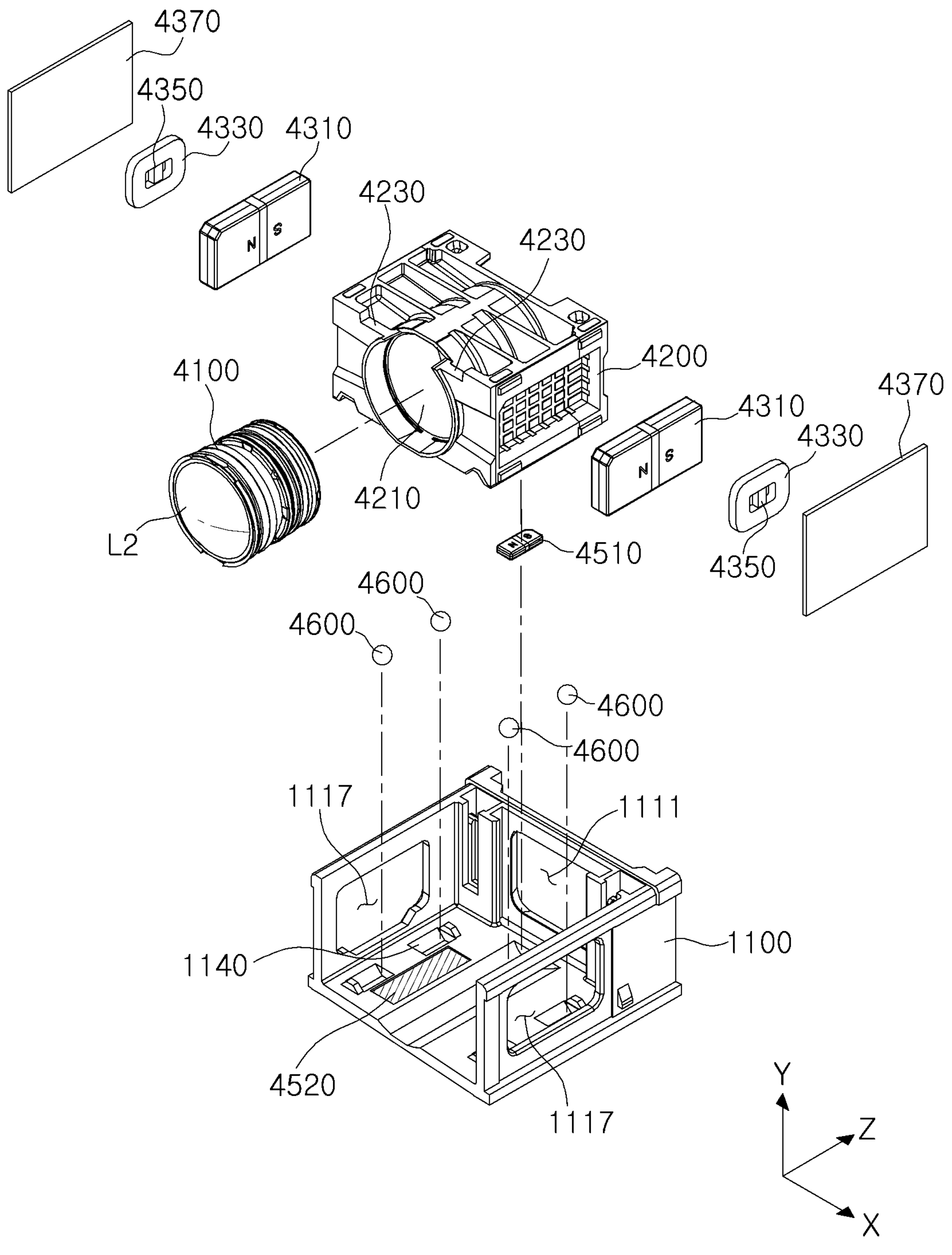
FIG. 10 and FIG. 11 illustrate schematic exploded perspective views of an example second lens module, in accordance with one or more embodiments.
Figure 11:
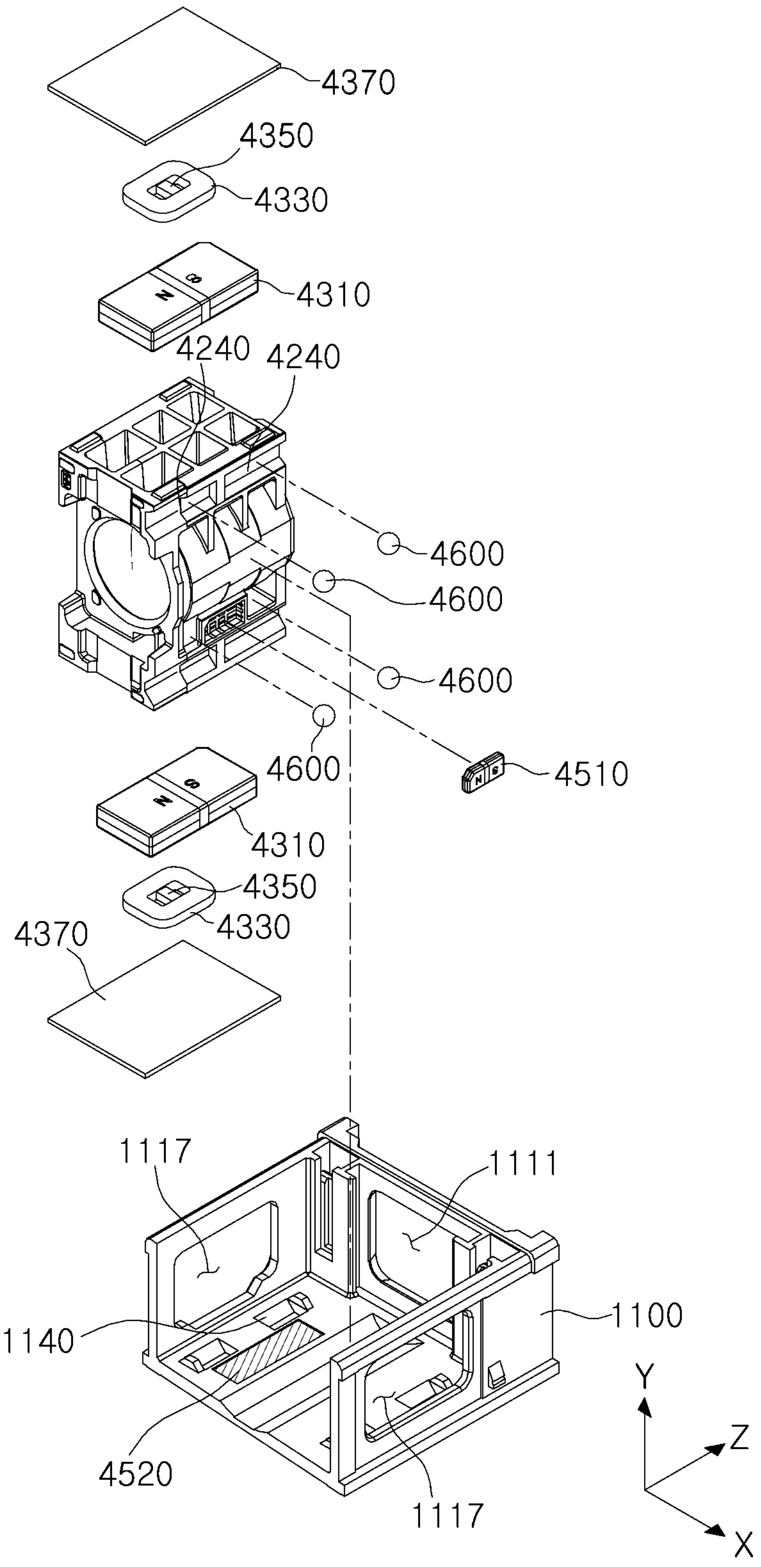
Figure 12:
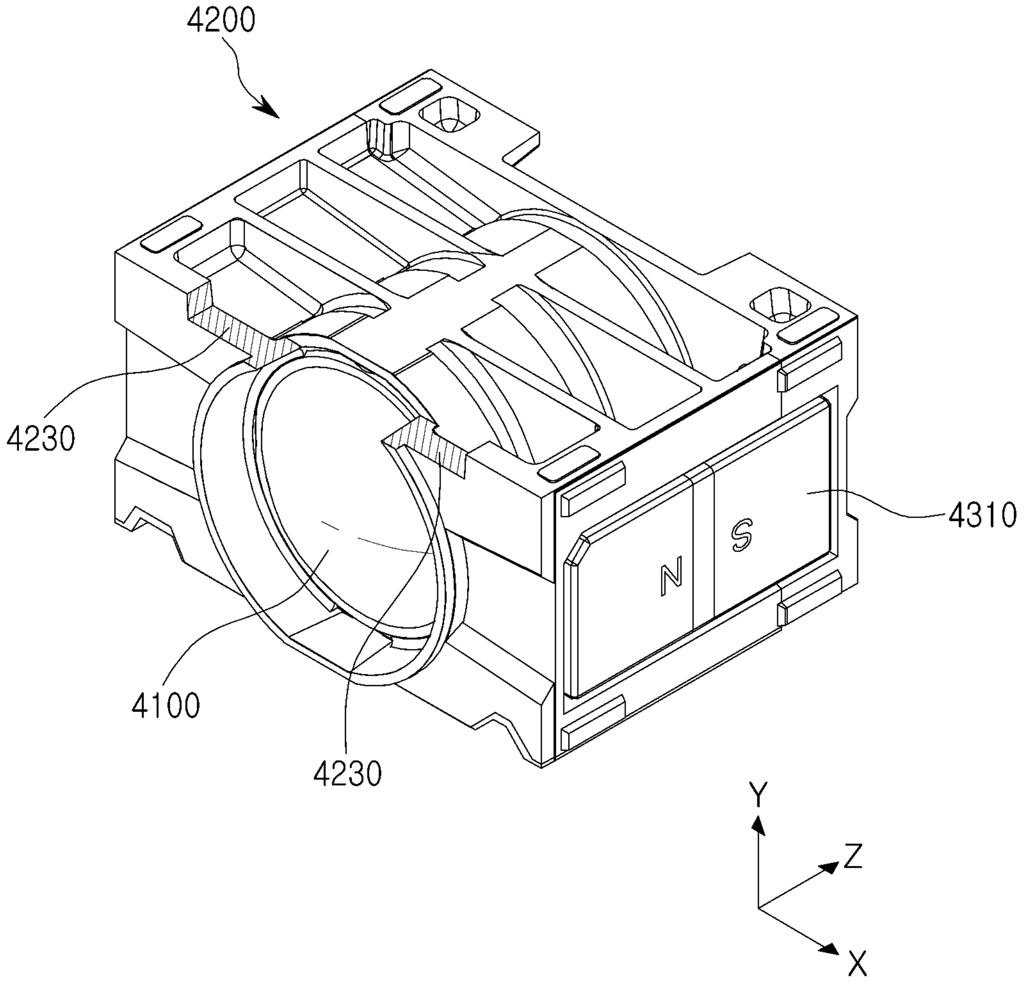
FIG. 12 illustrates a perspective view of an example lens holder, in accordance with one or more embodiments.
Figure 13A:
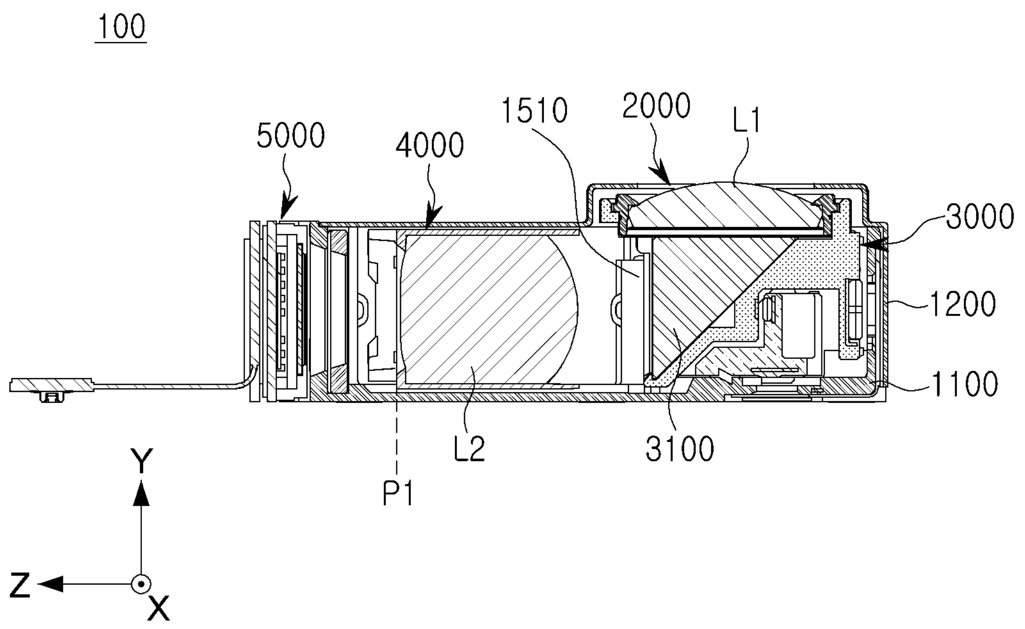
FIG. 13A and FIG. 13B illustrate an autofocusing operation (maximum stroke of a second lens module) of an example camera module, in accordance with one or more embodiments.
Figure 13B:
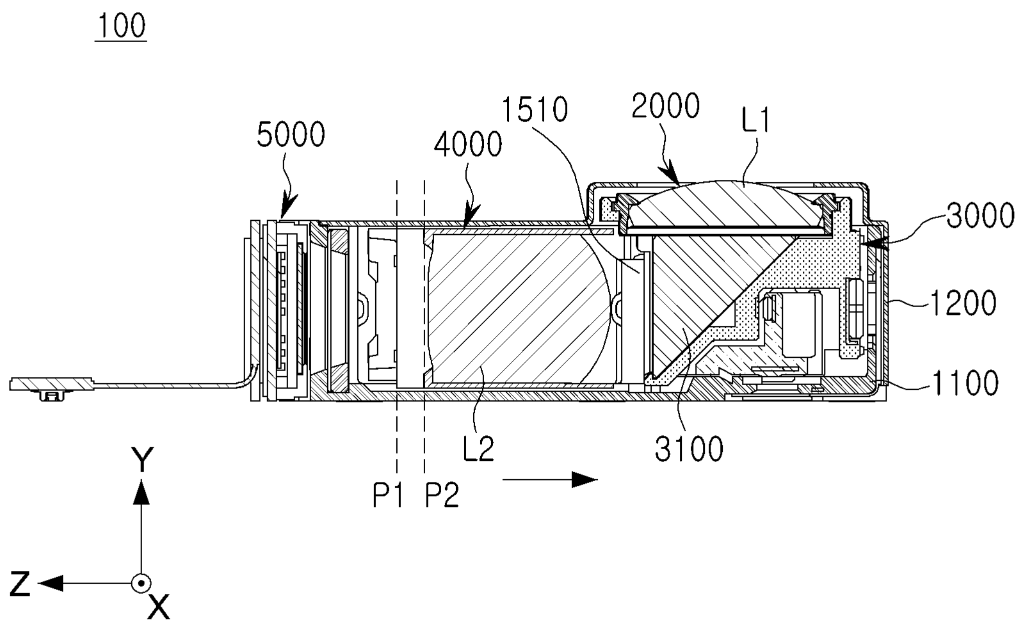
Figure 14:
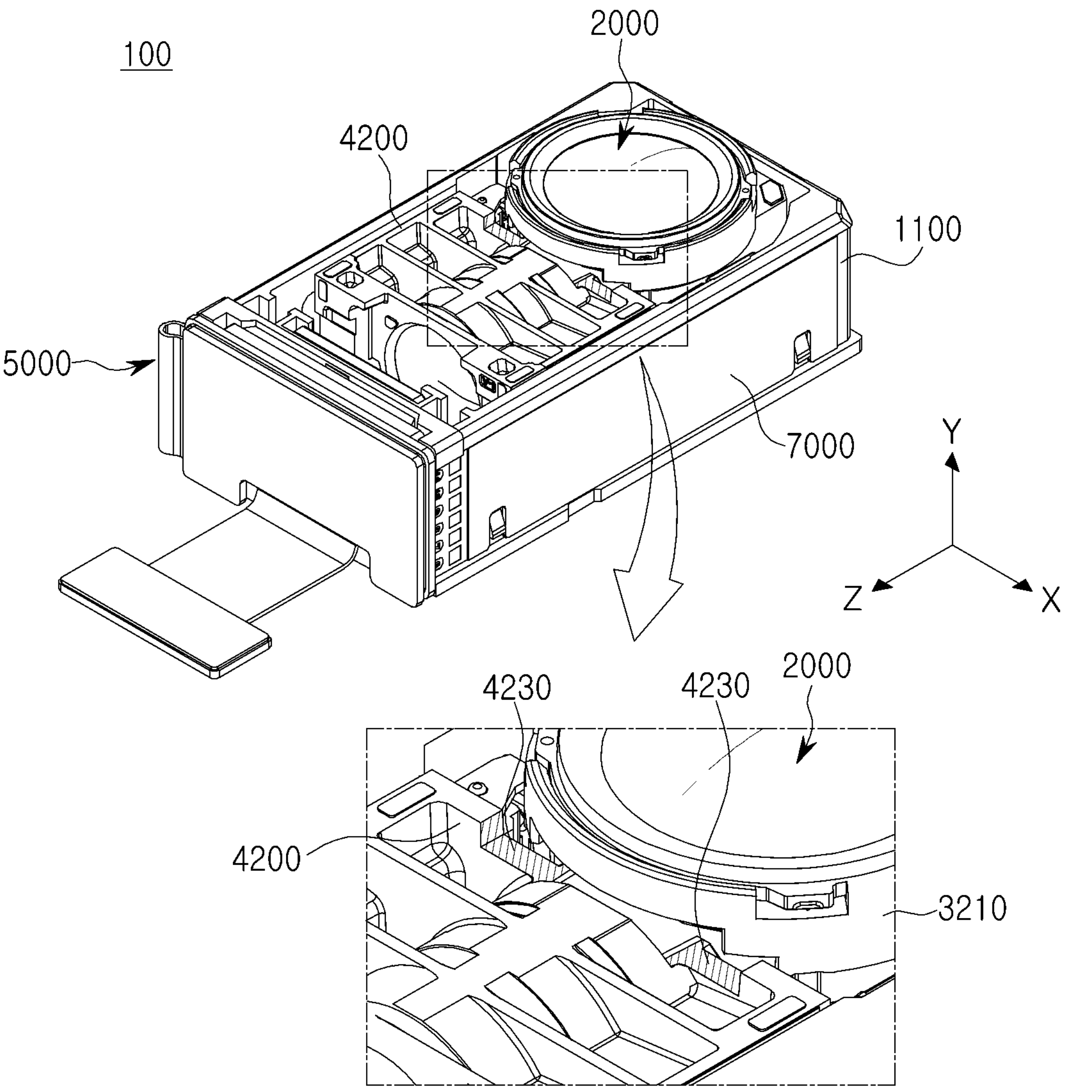
FIG. 14 illustrates a perspective view of FIG. 13B.
Figure 15:
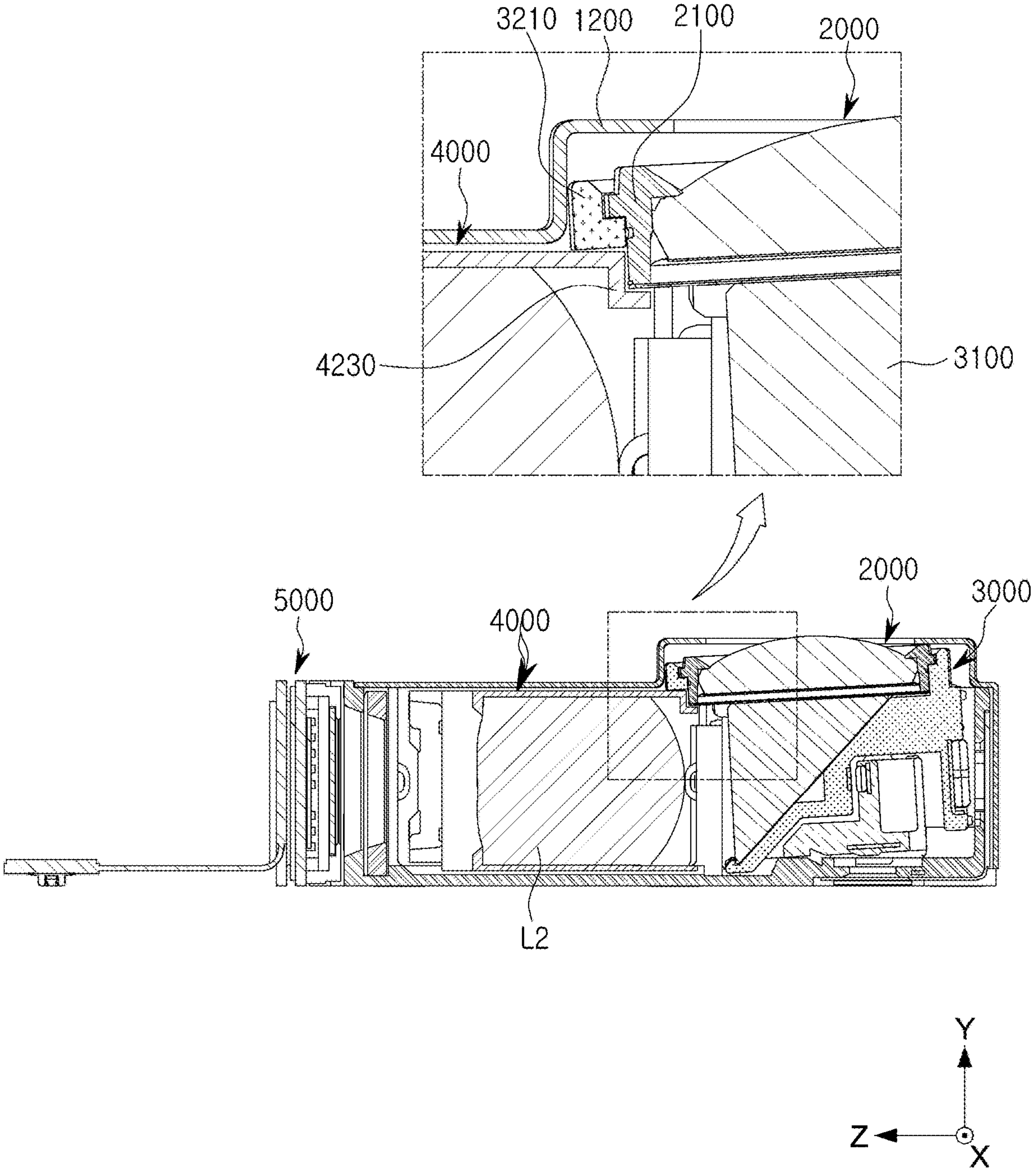
FIG. 15 illustrates a state in which a first lens module and a reflective module in FIG. 14 are tilted toward a second lens module.

FIGS. 10 and 11 are schematic exploded perspective views of a second lens module, in accordance with one or more embodiments, and FIG. 12 is a perspective view of a lens holder, in accordance with one or more embodiments. FIG. 13A and FIG. 13B illustrate an autofocusing operation (maximum stroke of the second lens module) of a camera module, in accordance with one or more embodiments, FIG. 14 is a perspective view of FIG. 13B, and FIG. 15 illustrates an example in which the first lens module and the reflective module are tilted toward the second lens module in FIG. 14.

Referring to FIG. 10 and FIG. 11, the second lens module 4000 may include a second lens barrel 4100 in which at least one lens L2 is accommodated. At least one lens L2 may be accommodated in the second lens barrel 4100 along the second optical axis direction (Z-axis direction). The second lens barrel 4100 may be accommodated in a lens holder 4200. The lens holder 4200 may include a hollow portion 4210 that is formed in the second optical axis direction (Z-axis direction), and the second lens barrel 4100 may be disposed in the hollow portion 4210. In another embodiment, the second lens barrel 4100 may be omitted, and at least one lens L2 may be directly mounted in the hollow portion 4210 of the lens holder 4200.

Referring to FIG. 12, the lens holder 4200, in accordance with one or more embodiments, may include an avoidance portion 4230. The avoidance portion 4230 may be provided in a form in which a portion of the upper surface of the lens holder 4200 is removed in the first optical axis direction (Y-axis direction) and may be provided in a portion adjacent to the first lens module 2000 and the reflective module 3000. In an example, the avoidance portion 4230 may be formed symmetrically with respect to the first optical axis (Y-axis) on both sides of the hollow portion 4210 where the second lens barrel 4100 is disposed. The avoidance portion 4230 may be a part for avoiding interference with the reflective module 3000.

The lens holder 4200 may be configured to be movable along the second optical axis direction (Z-axis direction). The second optical axis direction (Z-axis direction) may be perpendicular to both the first rotation axis (X-axis) and the second rotation axis (Y-axis). The second lens barrel 4100 is disposed in the lens holder 4200, and may thus be moved in the second optical axis direction (Z-axis direction) together with the lens holder 4200. Additionally, since the second lens barrel 4100 accommodates at least one lens L2, at least one lens L2 may also move in the second optical axis direction (Z-axis direction) together with the lens holder 4200.

The lens holder 4200 may move relative to the housing 1100. A second ball group G2 may be disposed between the lens holder 4200 and the housing 1100 to support the movement of the lens holder 4200.

In an embodiment, the second ball group G2 may include a plurality of guide balls 4600. In a non-limited example, the guide balls 4600 may be provided in an amount of three or more, for example, four. The plurality of guide balls 4600 may respectively support one side or the other side of the lens holder 4200.

The lens holder 4200 and the housing 1100 may include guide grooves 4240 and 1140 that accommodate a plurality of guide balls 4600. The guide grooves 4240 and 1140 may be provided in a number corresponding to the plurality of guide balls 4600 to accommodate a plurality of guide balls 4600, respectively.

In an embodiment, the lens holder 4200 may include four third guide grooves 4240 spaced apart in the second optical axis direction (Z-axis direction) on one side and the other side of the lens holder 4200, respectively, and the housing 1100 may include four fourth guide grooves 1140 to correspond to the third guide grooves 4240. The third guide grooves 4240 and the fourth guide grooves 1140 may be extended in a direction approximately in which the lens holder 4200 moves, for example, in the second optical axis direction (Z-axis direction).

The third guide groove 4240 and the fourth guide groove 1140 may be disposed to face each other in the first optical axis direction (Y-axis direction). A plurality of guide balls 4600 may be disposed between the third guide groove 4240 and the fourth guide groove 1140, and different portions of the plurality of guide balls 4600 may be accommodated in the third guide groove 4240 and the fourth guide groove 1140.

The plurality of guide balls 4600 may guide and support the movement of the lens holder 4200 while moving in a rolling manner along the extension direction of the third guide groove 4240 and the fourth guide groove 1140, while accommodated in the third guide groove 4240 and the fourth guide groove 1140. In an embodiment, the plurality of guide balls 4600 may be supported at two points in at least some of the third guide groove 4240 and the fourth guide groove 1140, and may be supported at one point in the remaining groove.

The lens holder 4200 may be supported on the housing 1100 with the aforementioned second ball group G2 interposed therebetween. For example, the lens holder 4200 may be supported on the housing 1100 in the first optical axis direction (Y-axis direction).

The lens holder 4200 may be supported in close contact with the housing 1100 based on a magnetic attraction generated between a pair of magnetic bodies 4510 and 4520. The pair of magnetic bodies 4510 and 4520 may include a third magnetic body 4510 disposed on the lens holder 4200 and a fourth magnetic body 4520 disposed on the housing 1100. In an embodiment, the third magnetic body 4510 may be a pulling magnet, and the fourth magnetic body 4520 may be a pulling yoke. The third magnetic body 4510 and the fourth magnetic body 4520 may be disposed to face each other in the first optical axis direction (Y-axis direction), and the magnetic attraction may be formed in the first optical axis direction (Y-axis direction).

The magnetic attraction generated between a pair of magnetic bodies 4510 and 4520 may prevent the second ball group G2 disposed between the lens holder 4200 and the housing 1100 from being detached, and thus the driving stability of the lens holder 4200 may be secured.

The second lens module 4200 may include a third driving unit 4300 that generates a driving force to move the lens holder 4200 relative to the housing 1100 in the second optical axis (Z-axis) direction.

The third driving unit 4300 may include a third driving magnet 4310 disposed in the lens holder 4200 and a third driving coil 4330 disposed in the housing 1100.

The third driving magnet 4310 may be disposed on both sides of the lens holder 4200.

The third driving coil 4330 may be disposed in the housing 1100 while being mounted on the substrate 7000. The housing 1100 may include a through-hole (or a fourth through-hole) 1117 on one surface to which the substrate 7000 with the third driving coil 4330 mounted thereon is coupled so that the third driving coil 4330 is exposed to the internal space of the housing 1100. In an embodiment, both sides of the housing 1100 may include the fourth through-hole 1117.

The third driving magnet 4310 and the third driving coil 4330 may be disposed to face each other in the first rotation axis direction (X-axis direction). In an embodiment, the third driving magnet 4310 may be disposed on both sides of the lens holder 4200, and the third driving coil 4330 may be exposed to the internal space of the housing 1100 through the fourth through-hole 1117, so that the third driving magnet 4310 and the third driving coil 4330 may directly face each other in the first rotation axis direction (X-axis direction).

On one side of the third driving magnet 4310 facing the third driving coil 4330, a first polarity region (N pole or S pole), a neutral region, and a second polarity region (S pole or N pole) may be sequentially provided along the movement direction of the lens holder 4200.

When power is applied to the third driving coil 4330, a driving force may be generated to move the lens holder 4200 in the second optical axis direction (Z-axis direction) due to the electromagnetic interaction between the third driving coil 4330 and the third driving magnet 4310.

Referring to FIGS. 13A and 13B, the lens holder 4200 may be configured to move between a first position P1 illustrated in FIG. 13A and a second position P2 illustrated in FIG. 13B based on the driving force generated by the third driving magnet 4310 and the third driving coil 4330. The distance between at least one lens L2 accommodated in the second lens barrel 4100 and the image sensor 5100 may be changed by moving the lens holder 4200, and the focus of the camera module 100 may be adjusted.

As the lens holder 4200 moves (maximally) away from the image sensor 5100, the lens holder 4200 may be disposed adjacent to the first lens module 2000 and the reflective module 3000. At this time, a portion of the upper surface of the lens holder 4200 may overlap with the first lens module 2000 and the reflective module 3000 in the first optical axis direction (Y-axis direction), and the avoidance portion 4230 of the lens holder 4200 may overlap with the lower end of the first lens barrel 2100 in the first optical axis direction (Y-axis direction). For example, the lens holder 4200 may avoid interference with the first lens module 2000 by providing the avoidance portion 4230 in a portion thereof that overlaps the lower end of the first lens barrel 2100.

Furthermore, in this state, even if the first lens module 2000 and the reflective module 3000 are tilted toward the lens holder 4200, based on the avoidance portion 4230, the tilting operation of the first lens module 2000 or the like may not be hindered.

A stopper (or second stopper) 1510 may be coupled to the housing 1100, to face the lens holder 4200. In an embodiment, the housing 1100 may include a protrusion wall that extends between a space where the first lens module 2000 and the reflective module 3000 are accommodated and a space where the second lens module 4000 is accommodated on both sides of the housing 1100, and the stopper 1510 may be coupled to the protrusion wall.

The stopper 1510 may limit the range of movement of the lens holder 4200 and prevent collision between the lens holder 4200 and the housing 1100 when the lens holder 4200 moves. Additionally, a buffer member may be combined with the stopper 1510 to reduce shock and noise generated when the lens holder 4200 hits the housing 1100.

A third position sensor 4350 may be mounted on the substrate 7000 together with a third driving coil 4330. The third position sensor 4350 may be disposed on the inner or outer side of the third driving coil 4330 and may be provided in one or more units.

The third position sensor 4350 may detect the position of the third driving magnet 4310. In an example, the third position sensor 4350 may be a Hall sensor, and may be positioned to face the third driving magnet 4310 to sense the movement amount of the third driving magnet 4310 by detecting a change in magnetic flux.

A third yoke 4370 may be positioned on the side opposite to the side of the substrate 7000 on which the third driving coil 4330 and the third position sensor 4350 are mounted. The third yoke 4370 may be positioned to face the third driving magnet 4310 with the third driving coil 4330 interposed therebetween. In an embodiment, the third yoke 4370 may serve to focus the magnetic force of the third driving magnet 4310.

As set forth above, a camera module, in accordance with one or more embodiments, may be manufactured with a height suitable for a thin product and may have improved optical performance.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A camera module, comprising:

a first lens module comprising a first lens barrel accommodating at least one lens disposed in a first optical axis direction;

a reflective module comprising a reflective member configured to convert a path of light incident in the first optical axis direction, a reflective holder comprising a mounting surface on which the reflective member is disposed, and a rotating holder comprising a surface on which the reflective holder is supported;

a second lens module comprising at least one lens disposed in a second optical axis direction, and configured to move in the second optical axis direction; and a housing having an internal space accommodating at least one of the first lens module, the reflective module, and the second lens module, wherein the reflective holder is configured to rotate with respect to two rotation axes which are perpendicular to each other, wherein the reflective holder comprising a seating portion provided on an upper side of the mounting surface and to which the first lens barrel is coupled, wherein the first lens module is configured to rotate together with the reflective module with respect to the two rotation axes which are perpendicular to each other, and wherein an upper end of the first lens barrel is provided at a lower height in the first optical axis direction than a highest vertex of a lens disposed closest to an object-side among the at least one lens arranged in the first optical axis direction.

2. The camera module of claim 1, wherein the seating portion is provided as a seating groove, and wherein the first lens barrel is coupled to a seating groove provided in the reflective holder.

3. The camera module of claim 1, wherein the reflective holder is configured to rotate relative to the rotating holder with respect to a first rotation axis, and the rotating holder is configured to rotate relative to the housing with respect to a second rotation axis perpendicular to the first rotation axis.

4. The camera module of claim 3, wherein at least one first ball member that forms the first rotation axis is disposed between the reflective holder and the rotating holder, and at least one second ball member that forms the second rotation axis is disposed between the rotating holder and the housing.

5. The camera module of claim 1, wherein the first lens module is disposed in front of the reflective module, and the second lens module is disposed in a rear of the reflective module, based on a path of incident light.

6. The camera module of claim 1, wherein the second lens module comprises a lens holder that accommodates the at least one lens disposed in the second optical axis direction, and wherein the lens holder comprises an avoidance portion in which a portion of an upper surface of the lens holder has been removed.

7. The camera module of claim 6, wherein the avoidance portion is provided on a side of the lens holder that is adjacent to the reflective module on the upper surface of the lens holder based on the second optical axis direction.

8. The camera module of claim 6, wherein the avoidance portion is provided on a portion of the lens holder that overlaps the first lens module in the first optical axis direction when the lens holder is positioned closest to the reflective module.

9. The camera module of claim 1, further comprising an image sensor module that is disposed in a rear of the second lens module and comprising an image sensor, wherein the second lens module is configured to move between the reflective module and the image sensor module.

10. A portable electronic device comprising the camera module of claim 1.

11. A camera module, comprising:

a reflective holder on which a reflective member and at least one lens disposed along a first optical axis direction; and a rotating holder comprising a surface on which the reflective holder is supported, wherein the reflective member and the at least one lens are configured to rotate about a first rotation axis, perpendicular to the first optical axis direction, and a second rotation axis, parallel to the first optical axis direction, wherein the at least one lens is accommodated in a first lens barrel in the first optical axis direction, wherein the reflective holder comprising a mounting surface on which the reflective member disposed and comprising a seating portion provided on an upper side of the mounting surface and to which the first lens barrel is coupled, and wherein an upper end of the first lens barrel is provided at a lower height in the first optical axis direction than a highest vertex of a lens disposed closest to an object-side among the at least one lens arranged in the first optical axis direction.

12. The camera module of claim 11, further comprising:

a lens holder in which at least one lens that is disposed in a second optical axis direction perpendicular to the first optical axis direction is disposed with respect to the reflective member, wherein the lens holder is configured to move in the second optical axis direction.

13. The camera module of claim 12, wherein the lens holder comprises an avoidance portion that is provided at an upper surface portion of the lens holder adjacent to the reflective module, and the upper surface portion of the lens module on which the avoidance portion is disposed is lower in height than other portions of the upper surface of the lens module.

14. The camera module of claim 13, wherein the avoidance portion overlaps a lower end of the first lens barrel in the first optical axis direction when the lens holder is positioned closest to the reflective module, and a gap is provided between the avoidance portion and the first lens barrel.

15. A portable electronic device comprising the camera module of claim 2.

16. An electronic device, comprising:

a camera module comprising:

a reflective module comprising a reflective member configured to convert a path of light incident in the first optical axis direction, and a reflective holder comprising a mounting surface on which the reflective member is mounted;

a first lens module disposed on a first optical axis, and comprising a first lens barrel coupled to a seating portion provided in an upper side of the reflective holder; and a second lens module, comprising a lens holder, and disposed on a second optical axis perpendicular to the first optical axis, wherein the lens holder comprises an avoidance portion provided on an upper surface of the lens holder, and wherein the avoidance portion overlaps a lower end of the first lens barrel.

17. The electronic device of claim 16, wherein the avoidance portion is provided in a form in which a portion of the upper surface of the lens holder is removed.

* * * * *